United States Patent Office 3,551,137
Patented Dec. 29, 1970

3,551,137
FLUX FOR ELECTROSLAG CONSUMABLE REMELTING OF NICKEL BASE SUPER ALLOYS AND CERTAIN IRON BASE ALLOYS
Gopal Krishna Bhat and Joseph B. Tobias, Pittsburgh, Pa., assignors to Electro-Slag Institute, Pittsburgh, Pa., a nonprofit corporation of Pennsylvania
No Drawing. Filed Jan. 10, 1968, Ser. No. 696,693
Int. Cl. B23k 35/34; C22b 9/10; C22d 7/00
U.S. Cl. 75—10                                                8 Claims

ABSTRACT OF THE DISCLOSURE

The flux composition for electroslag consumable electrode remelting of nickel base and other iron base alloys in weight percentages consists of 30% $CaF_2$, 40% $Al_2O_3$, and 30% CaO+MgO. A typical specific composition consists of 30% $CaF_2$, 40% $Al_2O_3$, 17% CaO and 13% MgO.

BACKGROUND OF THE INVENTION

The present invention relates to a flux composition for melting refining processes and in particular to a novel flux composition for electroslag consumable electrode remelting of nickel base super alloys and other iron base alloys.

The flux of the present invention may be employed in the arc melting process disclosed in U.S. Patent No. 3,067,473, but is preferably employed in the electroslag consumable electrode remelting process of the resistance melting type disclosed in copending application Ser. No. 696,935, filed Jan. 10, 1968. In the latter process, cast, rolled or forged electrodes or electrodes formed by compacting powdered metal or metal shavings or electrodes formed by joining small metal pieces or electrodes formed by other similar processes, which require further refining to produce the desired quality metal, are employed as consumable electrodes, the lower end of such electrodes being submerged in a bath of molten electro-conducting slag or flux, hereinafter referred to as flux, contained in an ingot mold. Resistance heating of the flux by maintaining a steady current flow from the electrode through the flux converts the electrical energy to heat energy. By proper control of voltage and current, the temperature of the molten flux bath is maintained higher than the electrode material whereby the submerged portion of the electrode slowly melts, forming discrete drops which pass through the flux blanket into a molten metal pool which cools to form a refined ingot of high quality and integrity. The resistance melting process provides a relatively slow melt rate under essentially quiescent conditions permitting the formation of desirable relatively shallow molten pool depths essential to axial solidification.

The flux blanket serves as the refining agent for removing harmful and undesirable impurities, for example, sulphur, phosphorus, low melting metals, gases, and non-metallic inclusions. The processes of impurity removal are both chemical and physical and include chemical reactions of the sulphur and phosphorus with the flux, vaporization of impurities having low boiling points, gaseous and solids absorption in the flux and floatation of nonmetallic inclusions from the electrode in the flux. Equally important, the flux blanket also serves as an electrical conductor and the composition of the flux blanket, accordingly, greatly influences the electrical parameters of the remelting process. It can therefore be seen that proper selection of flux composition is a critical factor in attaining a refined ingot of high quality and integrity.

SUMMARY OF THE PRESENT INVENTION

We have found that not all flux compositions are capable of stable performance during electroslag remelting and that only those fluxes which have their melting temperatures, molten electro-conductivities, and molten viscosities within certain ranges are capable of successful use in electroslag remelting and production of the desired high quality ingot. Furthermore, we have found that the type of metals and alloys which can be remelted by the foregoing process most often require different flux compositions if the desired ingot chemical composition is to be attained. For example, in operating the electroslag remelting process in an uncontrolled atmosphere, highly oxidizing conditions are present and affect the recovery of the easily oxidizable elements in the resulting ingots. The recovery of desirable elements in the resulting ingots, such as the highly oxidizable elements of aluminum and titanium, is often very poor, resulting in substandard ingots. Variations in flux compositions affects the recovery, as well as the stability, of the melting process and, while certain flux compositions may provide for high recovery, the process may also become unstable resulting in castings of diminished integrity. Thus, the flux composition is dependent on the type of metals and alloys, as well as on process requirements, whereby stable remelting and successful removal of impurities can occur.

Accordingly, it is a primary object of the present invention to provide a new flux composition for use in the electroslag consumable electrode remelting process which has optimal electrical qualities for efficient heat production resulting in efficient melting of the electrode; which has an electrical conductivity such as to preclude process disruption or cause defects such as cavities, blow holes, pores, etc., in the resulting ingot and to maintain the desired slow, stable consumable electrode remelt rate during the melt, particularly with respect to the resistance melting type process disclosed in the above-noted application; which has a molten viscosity precluding surface defects in the resulting ingot and readily providing for gas escape, absorption, and flotation removal of nonmetallic inclusions; and which has a temperature at which remelting occurs providing for the proper electrical conductivity and viscosity.

It is another object of the present invention to provide a novel flux composition for use in the electroslag consumable electrode remelting process for remelting of nickel base super alloys and other iron base alloys.

In accordance with the present invention, we have found that a flux consisting as to constituents in the molten state of $CaF_2$, $Al_2O_3$, CaO and MgO (percentages of composition by weight being hereinafter specified) has the electrical conductivity, viscosity and melting temperature within predetermined ranges, which affords efficient and effective stable melting of the consumable electrode in the remelting process, this flux composition being particularly effective in the electroslag remelting of nickel base super alloys and other iron base alloys in the resistance heating type process disclosed in the above-noted copending application. We have found that a proper proportion of calcium fluoride and alumina, together with the addition of the oxides of magnesium and calcium in a specified proportion thereto, provides an electrical conductivity through the molten flux capable of generating heat affording temperatures below the flux boiling point and sufficient to maintain the desirable slow melt rate which facilitates optimum axial ingot solidification. The viscosity of the molten flux remains sufficiently low, notwithstanding the addition of the oxides, such that the molten flux having the foregoing composition acts as a solvent for efficient removal of impurities, satisfactorily absorbing gases and solid inclusions, and physically floats nonmetallic inclusions to the top of the flux blanket.

It has been found that molten calcium fluoride is the most electrically conductive electroslag flux. By reducing the percentage of calcium fluoride to the specified percentage, in contradistinction to those fluxes having a relatively large calcium fluoride percentage, for example, up to 97%, and by the addition of the oxides, the resulting molten flux is reduced in electrical conductivity, thereby providing a higher heat capacity, the melting point of the flux is raised, the viscosity is raised slightly but within tolerable limits still permitting a satisfactory cleansing action as the melted drops flow through the molten flux, and the overall power consumption is diminished.

The novel flux of the present invention consists of the following constituents in percentage ranges of weight of the entire composition and in specific percentages of weight of the entire and preferred composition:

| Constituent | Percent ranges | Preferred, percent |
|---|---|---|
| Calcium fluoride (CaF$_2$) | 25-35 | 30 |
| Alumina (Al$_2$O$_3$) | 35-45 | 40 |
| Calcium oxide (CaO) and magnesium oxide (MgO) | 25-35 | 30 |

The foregoing composition has been found satisfactory in readily and rapidly establishing and maintaining the electro-slag consumable electrode remelting process, particularly with respect to the resistance melting type process disclosed in the above-noted application. This flux composition has a melting point lower than that of the consumable electrode material and a boiling point sufficiently above the melting point of the electrode. In the resistance melting type process, the electrical characteristics of this flux are effective to maintain the remelting process under quiescent conditions. The electrical conductance of the molten flux is such as to maintain stable consumable electrode remelting with the conductivity of the flux being well below the high conductivity which can lead to process disruption and well above the low conductivity which can lead to deleterious arc discharges across the flux bath in the latter type process. The flux having the foregoing preferred composition has a melting temperature of about 1320° C. plus or minus 10° C., and a molten electrical conductivity in the range of about 1 to 2 mhos per centimeter at the temperature at which remelting occurs. For example, at 1700° C., the foregoing preferred flux composition has a molten electrical conductivity of 1.35 and at 1800° C., has a conductivity of 1.92. The viscosity of this flux composition at the process temperature lies within the range of .1 to .01 poise.

The foregoing flux is preferably prepared by combining the proper weight percents of calcium fluoride, alumina, calcium oxide and magnesium oxide and subsequently blending the mixture mechanically in such a way that a homogeneous mixture is attained with the result that any given flux sample conforms to the specified composition. This homogeneous flux mixture can be employed in this condition or it may be bricketed or prefused or premelted, cooled and crushed, or premelted and used in the molten condition. Any one or all of the pure components may be substituted by equal weights of naturally occurring or commercial grades of the corresponding materials. For example, an equal weight of fluorspar, which may contain small amounts of impurity oxides, may be substituted for the calcium fluoride. The calcium fluoride content, if fluorspar is employed, would then be slightly less than 30%.

It has been found that a typical preferred composition having the foregoing materials in weight percents consists as follows:

| Materials | Preferred percent |
|---|---|
| Calcium fluoride (CaF$_2$) | 30 |
| Alumina (Al$_2$O$_3$) | 40 |
| Calcium oxide (CaO) | 17 |
| Magnesium oxide (MgO) | 13 |

It will be understood that the percentage ranges of the oxides of calcium and magnesium are for fluxes in the molten state and that other materials containing or reducible in part to such oxides can be employed in lieu of substantially pure calcium oxide and magnesium oxide provided only that such percentage ranges of such oxides are obtained when the flux is in the molten state. This flux composition provides a stable remelting process having optimal electrical conductivity and viscosity properties, particularly with respect to the electroslag remelting of nickel base super alloys, especially those containing titanium and aluminum in critical amounts, and also certain iron base alloys. For example, the flux composition has operated in a stable manner resulting in very superior and excellently formed nickel based alloyed ingots of Rene 41. A greater than 95% recovery of the two most reactive elements of this alloy, that is, titanium and aluminum, was accomplished by employing a flux having the foregoing composition. Additionally, the resulting ingot of Rene 41 demonstrated excellent and unexpected workability characteristics. When directly hot rolled in the form, for example, of a 7 inch diameter ingot as-cast condition to form a 1 inch thick plate, the resulting plate demonstrated superior overall mechanical properties as compared to a plate similarly rolled from a like unremelted electrode.

When the foregoing flux composition is employed in remelting nickel base super alloy Inco 713C in the electroslag consumable electrode process, the resulting ingot displayed a vast improvement in hot workability over ingots of Inco 713C formed by other processes. This improvement in hot workability with respect to Inco 713C is particularly significant as this alloy is commonly used as the as-cast and finished condition, partly due to its known poor hot workability. Of greater significance is the enhancement of mechanical properties. Additionally, the resulting ingot formed by the electroslag remelting employing a flux having the foregoing composition is a very high integrity casting with a recovery of greater than 90-95% of aluminum and titanium, respectively.

Marginal hot workabiilty is a known characteristic of Udimet 700. Electroslag consumable electrode remelting of this alloy employing a flux having the foregoing composition results in an ingot having demonstrated improved hot workability characteristics similarly as the above-noted alloys. Likewise, greater than 90-95% recovery of titanium and aluminum is accomplished.

The electrical characteristics of this specific flux are excellent with sufficient heat being generated to maintain the flux molten at temperatures above the melting point of the electrode and below the boiling point of the molten flux whereby stable and quiescent conditions are maintained throughout the remelting process. Furthermore, the viscosity of the molten flux is such that satisfactory removal of gases and nonmetallic inclusions in the material remelted occurs with the result that the resolidified ingots form very high quality metal.

In carrying out the electrolag consumable electrode remelting process of the present invention, the method hereof may be of the arc fusing type substantially as disclosed in U. S. Pat. No. 3,067,473, except for the flux therein employed, but is preferably of the resistance heating type substantially as disclosed in copending application Ser. No. 696,935, filed Jan. 10, 1968. In this method, the flux may be placed in the mold in a solid dry condition or may be premelted and poured into the mold in a molten state. The electrode to be remelted is then lowered such that the lower end is submerged below the surface of the flux blanket. In the case of flux introduced in a solid dry condition, arcing will occur when the current is initially applied until the flux is completely melted, whereupon the current flow through the molten flux heats the same by resistance heating and the molten flux thereby melts the electrode. If the flux is premelted, a steady current flow through the electrode and flux blanket is almost immediately attained. In either case, the melted metal drops from the lower end of the electrode and flow through the flux blanket for deposit in a molten metal pool which resolidifies to form an ingot of high quality. The flux blanket performs a cleansing or scrubbing action as the molten metal drops therethrough, whereupon gaseous and nonmetallic inclusions and other impurities are removed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A flux for refining metals consisting of fluorspar, alumina and effective amounts of both CaO and MgO to provide electrical conductivity through the molten flux capable of generating heat affording temperatures below the flux boiling point and sufficient to maintain the desirable slow melt rate which facilitates optimum axial ingot solidification, the said oxides of calcium and magnesium in percentages of weight of the entire composition within a range of 25-35, 35-45, and 25-35, respectively.

2. A flux according to claim 1 consisting of about 30% fluorspar, 40% alumina and 30% of the oxides of calcium and magnesium.

3. A flux according to claim 1 wherein the weight percentages are available in the molten state.

4. A flux according to claim 2 wherein the oxides consist of about 17% CaO and about 13% MgO.

5. A method of refining metals comprising the steps of forming a flux composition by combining fluorspar, alumina and effective amount of both CaO and MgO to provide an electrical conductivity through the molten flux capable of generating heat affording temperature below the flux boiling point and sufficient to maintain the desirable slow melt rate which facilitates optimum axial ingot solidification, the said oxides of calcium and magnesium in percentages of weight of the entire composition within a range of 25-35, 35-45, and 25-35, respectively, submerging a portion of a consumable electrode into the flux composition and heating the flux composition by passing an electrical current therethrough.

6. The method according to claim 5 wherein the flux composition consists of about 30% fluorspar, 40% alumina, and 30% of the oxides of calcium and magnesium.

7. The method according to claim 6 wherein the oxides consist of about 17% calcium and about 13% magnesium.

8. The method according to claim 5 wherein the weight percentages are available in the molten state.

References Cited

UNITED STATES PATENTS

| | | | |
|---|---|---|---|
| 2,694,023 | 11/1954 | Hopkins | 75—12 |
| 2,868,681 | 1/1959 | Shrubsall | 148—26 |

WINSTON A. DOUGLAS, Primary Examiner

P. D. ROSENBERG, Assistant Examiner

U.S. Cl. X.R.

75—94; 148—26